(12) United States Patent
Soudier et al.

(10) Patent No.: US 7,426,099 B2
(45) Date of Patent: Sep. 16, 2008

(54) CONTROLLER METHOD, APPARATUS AND ARTICLE SUITABLE FOR ELECTRIC DRIVE

(75) Inventors: Christophe Soudier, Ypsilanti, MI (US); Bing Cheng, West Bloomfield, MI (US); Steven J. Kowalec, Plymouth, MI (US); Venkatapathi R. Nallapa, West Bloomfield, MI (US); Richard J. Hampo, Plymouth, MI (US)

(73) Assignee: Continental Automotive Systems US, Inc., Auburn Hills ( * ) Notice: Subject to any disclaimer, the term of this patent is extended or adjusted under 35 U.S.C. 154(b) by 36 days.

(21) Appl. No.: 11/480,311

(22) Filed: Jun. 29, 2006

(65) Prior Publication Data

US 2007/0016340 A1    Jan. 18, 2007

Related U.S. Application Data

(60) Provisional application No. 60/695,829, filed on Jun. 30, 2005.

(51) Int. Cl.
 *H02H 7/08* (2006.01)
(52) U.S. Cl. ............... 361/23; 361/18; 701/29; 701/33; 701/41; 340/65.1
(58) Field of Classification Search ........ 318/139, 318/470; 701/29, 36, 41, 45, 114, 33; 707/100; 361/5, 93.1, 18, 90, 62
See application file for complete search history.

(56) References Cited

U.S. PATENT DOCUMENTS

| | | | | |
|---|---|---|---|---|
| 4,142,231 A | | 2/1979 | Wilson et al. | 363/141 |
| 4,159,470 A | * | 6/1979 | Strojny et al. | 714/4 |
| 4,224,663 A | | 9/1980 | Maiese et al. | 363/144 |
| 4,458,305 A | | 7/1984 | Buckle et al. | 363/141 |
| 4,476,493 A | * | 10/1984 | Poetsch et al. | 348/97 |
| 4,661,897 A | | 4/1987 | Pitel | 363/17 |
| 4,674,024 A | | 6/1987 | Paice et al. | 363/71 |
| 4,726,024 A | * | 2/1988 | Guziak et al. | 714/24 |

(Continued)

FOREIGN PATENT DOCUMENTS

| | | |
|---|---|---|
| DE | 195 19 538 A1 | 11/1996 |
| EP | 0 427 143 A2 | 5/1991 |
| EP | 0 578 108 A1 | 1/1994 |
| JP | 09046812 | 2/1997 |
| JP | 9-117126 | 5/1997 |
| JP | 2001-145206 | 5/2001 |
| WO | WO 2004/040599 A1 | 5/2004 |

OTHER PUBLICATIONS

Invitation to Pay Additional Fees and Partial International Search Report mailed Aug. 22, 2007.

(Continued)

*Primary Examiner*—Paul Ip (57) ABSTRACT

A control system, method and article allows a monitoring module to monitor operation of a main controller in an electric drive, by providing questions and evaluating the accuracy and/or timeliness of responses from the main controller. Upon detection of an excessive number of incorrect or late responses, the monitoring module can shutdown operation, and may provide an alternative communications path, thereby preventing corrupt data from reaching a vehicle network, while providing communications for diagnostic and recovery such as by provision of new software or firmware instructions. The main controller may monitor the operation of the monitoring module, taking appropriate action if a fault is detected. Disabling a supply of power to a traction motor may be based on current operating conditions, such as speed.

16 Claims, 6 Drawing Sheets

U.S. PATENT DOCUMENTS

| | | | |
|---|---|---|---|
| 4,803,609 A | 2/1989 | Gillett et al. | 363/17 |
| 4,868,732 A | 9/1989 | Gillett et al. | 363/90 |
| 5,172,310 A | 12/1992 | Deam et al. | 363/144 |
| 5,184,291 A | 2/1993 | Crowe et al. | 363/37 |
| 5,230,632 A | 7/1993 | Baumberger et al. | 439/66 |
| 5,243,757 A | 9/1993 | Grabbe et al. | 29/882 |
| 5,264,761 A | 11/1993 | Johnson | 315/291 |
| 5,395,252 A | 3/1995 | White | 439/66 |
| 5,422,440 A | 6/1995 | Palma | 174/133 B |
| 5,436,837 A * | 7/1995 | Gerstung et al. | 701/29 |
| 5,439,398 A | 8/1995 | Testa et al. | 439/801 |
| 5,445,526 A | 8/1995 | Hoshino et al. | 439/69 |
| 5,459,356 A | 10/1995 | Schulze et al. | 257/773 |
| 5,469,351 A * | 11/1995 | Masrur et al. | 363/56.02 |
| 5,504,378 A | 4/1996 | Lindberg et al. | 307/10.1 |
| 5,508,560 A | 4/1996 | Koehler et al. | 257/730 |
| 5,537,074 A | 7/1996 | Iversen et al. | 327/564 |
| 5,550,762 A * | 8/1996 | Doll | 702/183 |
| 5,559,374 A | 9/1996 | Ohta et al. | 257/723 |
| 5,588,720 A * | 12/1996 | Mattern | 303/122.08 |
| 5,610,449 A | 3/1997 | Takahashi et al. | 307/43 |
| 5,635,751 A | 6/1997 | Ikeda et al. | 257/584 |
| 5,653,598 A | 8/1997 | Grabbe | 439/66 |
| 5,699,232 A | 12/1997 | Neidig et al. | 361/752 |
| 5,736,786 A | 4/1998 | Sankaran et al. | 257/717 |
| 5,756,935 A | 5/1998 | Balanovsky et al. | 174/52.1 |
| 5,847,951 A | 12/1998 | Brown et al. | 363/147 |
| 5,880,568 A | 3/1999 | Bederna et al. | 318/563 |
| 5,892,279 A | 4/1999 | Nguyen | 257/712 |
| 5,938,451 A | 8/1999 | Rathburn | 439/66 |
| 5,973,923 A | 10/1999 | Jitaru | 361/704 |
| 5,975,914 A | 11/1999 | Uchida | 439/66 |
| 6,011,461 A * | 1/2000 | Luper | 340/441 |
| 6,038,156 A | 3/2000 | Inam et al. | 363/133 |
| 6,054,765 A | 4/2000 | Eytcheson et al. | 257/724 |
| 6,072,707 A | 6/2000 | Hochgraf | 363/71 |
| 6,078,173 A * | 6/2000 | Kumar et al. | 324/158.1 |
| 6,078,501 A | 6/2000 | Catrambone et al. | 361/704 |
| 6,144,276 A | 11/2000 | Booth | 336/61 |
| 6,147,583 A | 11/2000 | Rinne et al. | 336/200 |
| 6,166,937 A | 12/2000 | Yamamura et al. | 363/141 |
| 6,176,707 B1 | 1/2001 | Neidich et al. | 439/66 |
| 6,181,992 B1 | 1/2001 | Gurne et al. | |
| 6,211,767 B1 | 4/2001 | Jitaru | 336/200 |
| 6,212,086 B1 | 4/2001 | Dinh | 363/144 |
| 6,212,087 B1 | 4/2001 | Grant et al. | 363/144 |
| 6,222,437 B1 | 4/2001 | Soto et al. | 336/200 |
| 6,233,149 B1 | 5/2001 | Bailey et al. | 361/704 |
| 6,239,566 B1 | 5/2001 | Tareilus et al. | |
| 6,246,343 B1 * | 6/2001 | Deng et al. | 341/11 |
| 6,249,024 B1 | 6/2001 | Mangtani | 257/341 |
| 6,278,354 B1 | 8/2001 | Booth | 336/200 |
| 6,292,371 B1 | 9/2001 | Toner, Jr. | 361/752 |
| 6,324,659 B1 * | 11/2001 | Pierro | 714/48 |
| 6,338,152 B1 * | 1/2002 | Fera et al. | 714/48 |
| 6,362,988 B1 * | 3/2002 | Deng et al. | 363/148 |
| 6,388,898 B1 | 5/2002 | Fan et al. | 363/20 |
| 6,434,008 B1 | 8/2002 | Yamada et al. | 361/728 |
| 6,498,320 B2 | 12/2002 | Moriguchi et al. | 219/130.21 |
| 6,515,858 B2 | 2/2003 | Rodriguez et al. | 361/695 |
| 6,580,974 B2 * | 6/2003 | Haag et al. | 701/1 |
| 6,603,672 B1 | 8/2003 | Deng et al. | 363/37 |
| 6,703,703 B2 | 3/2004 | Grant | 257/688 |
| 6,707,284 B2 | 3/2004 | Lanni | 323/297 |
| 6,740,968 B2 | 5/2004 | Matsukura et al. | 257/707 |
| 6,862,195 B2 | 3/2005 | Jitaru | 363/17 |
| 6,906,404 B2 | 6/2005 | Maly et al. | 257/678 |
| 6,944,033 B1 | 9/2005 | Xu et al. | 363/16 |
| 7,015,658 B2 | 3/2006 | Tsay et al. | 315/307 |
| 7,019,996 B2 | 3/2006 | Zhu et al. | 363/144 |
| 7,064,526 B2 * | 6/2006 | Patterson | 322/46 |
| 7,106,564 B2 * | 9/2006 | Deng et al. | 361/62 |
| 7,242,167 B2 * | 7/2007 | Patterson | 322/59 |
| 7,254,004 B2 * | 8/2007 | Mladenik et al. | 361/93.1 |
| 2002/0034088 A1 | 3/2002 | Parkhill et al. | 363/144 |
| 2002/0080627 A1 | 6/2002 | Baretich et al. | 363/25 |
| 2002/0109152 A1 | 8/2002 | Kobayashi et al. | 257/177 |
| 2002/0111050 A1 | 8/2002 | Parkhill et al. | 439/65 |
| 2002/0118560 A1 | 8/2002 | Ahmed et al. | 363/144 |
| 2002/0126465 A1 | 9/2002 | Maly et al. | 361/818 |
| 2002/0167828 A1 | 11/2002 | Parkhill et al. | 363/144 |
| 2002/0186545 A1 | 12/2002 | Fukada et al. | 361/719 |
| 2003/0007366 A1 | 1/2003 | Drummond et al. | 363/17 |
| 2003/0117752 A1* | 6/2003 | Gilbert et al. | 361/18 |
| 2004/0085787 A1* | 5/2004 | Perreault et al. | 363/89 |
| 2004/0093243 A1* | 5/2004 | Bodin et al. | 705/5 |
| 2004/0164206 A1 | 8/2004 | Jammu et al. | |
| 2004/0228094 A1 | 11/2004 | Ahmed et al. | 361/702 |
| 2005/0018371 A1* | 1/2005 | Mladenik et al. | 361/78 |
| 2005/0083655 A1 | 4/2005 | Jairazbhoy et al. | 361/699 |
| 2005/0096811 A1* | 5/2005 | Bodin et al. | 701/33 |
| 2005/0105229 A1* | 5/2005 | Deng et al. | 361/90 |
| 2005/0125117 A1* | 6/2005 | Breed | 701/29 |
| 2005/0128706 A1 | 6/2005 | Maly et al. | 361/699 |
| 2005/0144183 A1* | 6/2005 | McQuown et al. | 707/100 |
| 2005/0171661 A1* | 8/2005 | Abdel-Malek et al. | 701/33 |
| 2005/0195545 A1* | 9/2005 | Mladenik et al. | 361/93.1 |
| 2005/0270745 A1 | 12/2005 | Chen et al. | 361/707 |
| 2006/0115693 A1* | 6/2006 | Toth et al. | 429/13 |
| 2006/0150016 A1* | 7/2006 | Miller et al. | 714/25 |
| 2006/0195248 A1* | 8/2006 | Kim et al. | 701/100 |
| 2006/0272386 A1* | 12/2006 | Mayer-wegellin et al. | 73/1.37 |
| 2006/0291109 A1* | 12/2006 | Wang | 361/5 |
| 2007/0005203 A1* | 1/2007 | Sundaram et al. | 701/33 |
| 2007/0005528 A1* | 1/2007 | Mukherjee et al. | 706/15 |
| 2007/0012492 A1* | 1/2007 | Deng et al. | 180/65.1 |
| 2007/0013497 A1* | 1/2007 | Watanabe | 340/435 |
| 2007/0021882 A1* | 1/2007 | Hartrey et al. | 701/29 |
| 2007/0061631 A1* | 3/2007 | Nakamura | 714/43 |
| 2007/0067078 A1* | 3/2007 | Salman et al. | 701/34 |
| 2007/0067092 A1* | 3/2007 | Burkatovsky | 701/114 |
| 2007/0069877 A1* | 3/2007 | Fogelstrom | 340/442 |
| 2007/0070667 A1* | 3/2007 | Stancu et al. | 363/132 |
| 2007/0076593 A1* | 4/2007 | Sakurai et al. | 370/219 |
| 2007/0088473 A1* | 4/2007 | Moon et al. | 701/36 |
| 2007/0093947 A1* | 4/2007 | Gould et al. | 701/29 |
| 2007/0192004 A1* | 8/2007 | Fukuda | 701/41 |
| 2007/0208475 A1* | 9/2007 | Shimizu | 701/45 |
| 2007/0219749 A1* | 9/2007 | Jayabalan et al. | 702/182 |
| 2007/0236186 A1* | 10/2007 | Patterson | 322/59 |

OTHER PUBLICATIONS

Boroyevich, D., et al., "A View at the Future of Integration in Power Electronics Systems," in *Proceedings of the PCIM Europe 2005*, Nuremberg, Germany, Jun. 7, 2005, pp. 11-20.

de Sorgo, M., "A Thermal Comparison of Power Device Mounting Technologies," Chomerics, 7 pages, Dec. 1, 2000.

Easler, K., "Continued Study in Power Module Substrates for Automotive Harsh Environments," Kyocera America, Inc., *Proceedings of SPIE*, 5231:69-72, 2003.

Hirokawa, M., et al., "Improvement of Transient Response in High-Current Output DC-DC Converters," in *Proceedings of the 18th Annual IEEE Applied Power Electronics Conference and Exposition*, Miami Beach, FL, Feb. 9-13, 2003, pp. 705-710.

Lee, F., et al., "Technology Trends Toward a System-in-a-Module in Power Electronics," *IEEE Circuits and Systems Magazine*, 24(4):4-23, Fourth Quarter 2002.

Mohan et al., *Power Electronics: Converters, Applications and Designs*, John Wiley & Sons Inc., USA, 1989, Chapter 26-8, "Circuit Layout," p. 654.

Panov, Y., et al., "Design and Performance Evaluation of Low-Voltage/High-Current DC/DC On-Board Modules," in *Proceedings of* the 14th *Annual IEEE Applied Power Electronics Conference and Exposition*, Dallas, TX, Mar. 14-18, 1999, pp. 545-552.

Persson, E., "Power Electronic Design and Layout Techniques for Improved Performance and Reduced EMI," in *Proceedings of Power Electronics in Transportation, IEEE*, Dearborn, Michigan, Oct. 20-21, 1994, pp. 79-82.

Sugai, K., et al., "A New Structure of Low Inductance Ceramic Substrate for Power Module," in *Proceedings of the 3rd Intl. Congress for 42V PowerNet*, Munich, Germany, Nov. 12-14, 2002, 13 pages.

Xu, P., et al., "A Family of Novel Interleaved DC/DC Converters for Low-Voltage High-Current Voltage Regulator Module Applications," in *Proceedings of the 32nd Annual IEEE Power Electronics Specialists Conference*, Vancouver, Canada, Jun. 17-21, 2001, pp. 1507-1511.

U.S. Appl. No. 60/233,992, filed Sep. 20, 2000, Parkhill et al.
U.S. Appl. No. 60/233,993, filed Sep. 20, 2000, Parkhill et al.
U.S. Appl. No. 60/233,994, filed Sep. 20, 2000, Parkhill et al.
U.S. Appl. No. 60/233,995, filed Sep. 20, 2000, Parkhill et al.
U.S. Appl. No. 60/233,996, filed Sep. 20, 2000, Parkhill et al.
U.S. Appl. No. 60/471,387, filed May 16, 2003, Flett et al.
U.S. Appl. No. 60/560,755, filed Jun. 4, 2004, Chen et al.
U.S. Appl. No. 60/695,829, filed Jun. 30, 2005, Soudier et al.
International Search Report and Written Opinion dated Jan. 30, 2008.

* cited by examiner

CONTROLLER METHOD, APPARATUS AND ARTICLE SUITABLE FOR ELECTRIC DRIVE

CROSS-REFERENCE TO RELATED APPLICATION

This application claims the benefit under 35 U.S.C. § 119(e) of U.S. Provisional Patent Application No. 60/695,829, filed Jun. 30, 2005.

BACKGROUND OF THE INVENTION

1. Field of the Invention

This disclosure generally relates to electrical power systems, and more particularly to a controller for controlling operation of electric drives, for example electric drives associated with electric and/or hybrid vehicles.

2. Description of the Related Art

Power conversion systems transform and/or condition power from one or more power sources for supplying power to one or more loads. A power conversion system component commonly referred to as an "inverter" transforms direct current (DC) to alternating current (AC) for use in supplying power to an AC load. A power conversion system component commonly referred to as a "rectifier" transforms AC to DC. A power conversion system component commonly referred to as a "DC/DC converter" steps-up or steps-down DC voltage. In some embodiments, these components may be bi-directionally operable to perform two or more functions. These functions may, in some cases be inverse functions. For example, a switch mode inverter may be operable to invert DC to AC in one direction, while also operable to rectify AC to DC in another direction. An appropriately configured and operated power conversion system may include any one or more of these components to perform any one or more of these functions.

In common usage, the term "converter" applies generically to all power conversion components whether inverters, rectifiers and/or DC/DC converters and is used herein and in the claims in that generic sense. Power converters typically employ power semiconductor devices, such as insulated gate bipolar transistors (IGBTs), metal oxide semiconductor field effect transistors (MOSFETs), and/or semiconductor diodes. One or more power conversion system components may be provided as a self-contained unit, commonly referred to as a power module, which comprises an electrically insulative housing that houses at least a portion of the power conversion system component, and appropriate connectors such as phase terminals or bus bars.

Many applications employ the delivery of high power, high current and/or high voltage from a power source to a load. For example, it may be desirable in transportation applications to provide a relatively high DC voltage to an inverter to supply AC power for driving a load such as a traction motor for propelling an electric or hybrid electric vehicle. It may also be desirable at the same time to provide relatively low voltage AC or DC power for driving accessory or peripheral loads. Such applications may employ one or more of a variety of power sources. Applications may, for example, employ energy producing power sources such as internal combustion engines or arrays of fuel cells and/or photovoltaic cells. Applications may additionally, or alternatively, employ power sources such as energy storage devices, for example, arrays of battery cells, super- or ultra-capacitors, and/or flywheels. Often, such applications employ a power converter to transform and/or condition the power, for example, stepping down the voltage at which the power is supplied to the load.

Operation of electric drives, particular those employing permanent magnet motors must address a number of issues not presented by other types of drives, such as drives employing internal combustion engines. Additionally, it may be desirable to provide some limited ability to continue operating an electric drive after a fault has occurred. Such capability may be referred to as "limp home" capability, which may, for example, allow operation of the electric drive at reduced power for a time sufficient to move a vehicle to a point of safety. Addressing such problems may be commercially beneficial to the acceptance of electric and/or hybrid vehicles. Thus, new approaches to accurately detect, handle and/or remedy fault conditions in electric drives are desirable.

BRIEF SUMMARY OF THE INVENTION

In at least one embodiment, a control system and method or article provides a main controller to control operation of an electric drive such as an electric drive for a vehicle, and an independent monitoring module that monitors the operation of the main controller. The monitoring module, for example monitoring logic configured in a field programmable gate array or the like, may from time-to-time provide questions or queries to the main controller. The monitoring logic verifies the accuracy and/or timeliness of responses by the main controller to the questions or queries, and maintains one or more counters reflecting such.

In at least one embodiment, a control system and method or article provides a main controller to control operation of an electric drive such as an electric drive for a vehicle, and an independent monitoring module that monitors the operation of the main controller. The monitoring module, for example monitoring logic configured in a field programmable gate array or the like, may from time-to-time provide questions or queries to the main controller. The monitoring logic verifies the accuracy and/or timeliness of responses by the main controller to the questions or queries, and maintains one or more counters reflecting such. Additionally, the main controller monitors the operation of the monitoring logic. From time-to-time, the main controller provides an intentionally incorrect answer to a question or query from the monitoring logic. The main controller also verifies the timeliness of questions or queries from the monitoring module, and maintains one or more counters reflecting such.

In at least one embodiment, a control system and method or article provides the ability to load new instructions and/or perform diagnostics and analysis after a shutdown occurs in response to detection of a fault condition. The control system and method or article may disable a regular communications path between a vehicle and a main controller such as a microprocessor to prevent the communications of corrupted data. The control system and method or article may provide an alternative communications path allowing diagnostics, analysis and the reconfiguring of instructions, for example, via loading of new software and/or firmware instructions. Such may allow the resetting of the main controller after appropriate troubleshooting and corrective action.

In at least one embodiment, a control system and method or article employs fault and monitoring logic to determine an appropriate way to disable an electric drive in response to a fault condition. The control system and method or article may determine the appropriate response based on a speed, for example an angular velocity, of a traction motor controlled by the control system. The control system and method or article may disable a gate drive placing all power semiconductor switches in a DC/AC converter supplying power to the traction motor in an open, non-conducting state, for example where the speed is below a speed threshold. The control system and method or article may disable a gate drive placing some of the power semiconductor switches in an open, non-conducting state, and other of the power semiconductor switches in a closed, conducting state to electrically short the traction motor, for example where the speed is above a speed threshold.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments. However, one skilled in the art will understand that the invention may be practiced without these details. In other instances, well-known structures associated with power converters, controllers and/or gate drives have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Figure 1A:
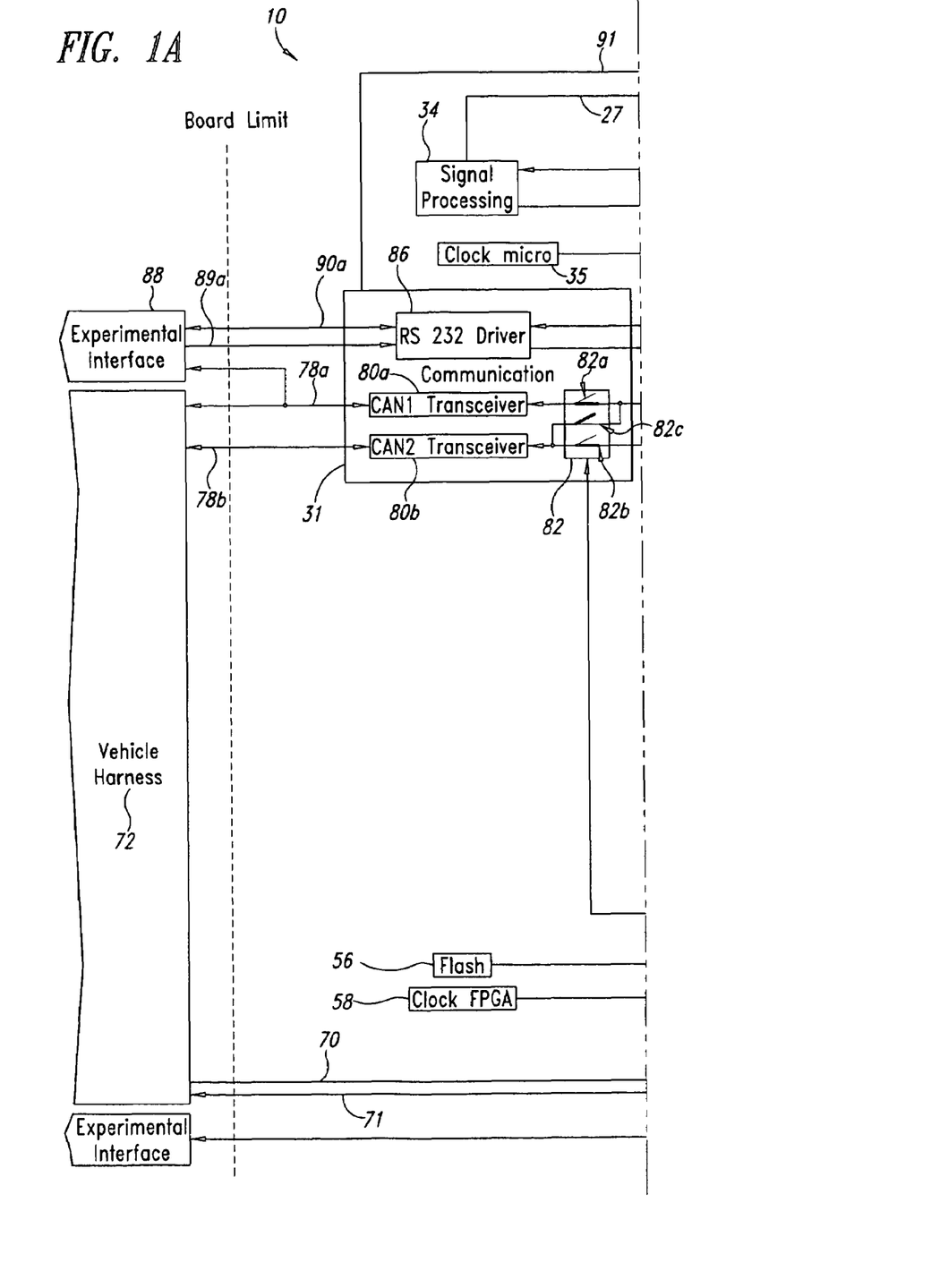
FIGS. 1A-1C are a functional block diagram of a portion of an electric drive system employing a microprocessor as a main controller and a field programmable gate array implementing monitoring logic to monitor the main controller, according to one illustrated embodiment.
Figure 1B:
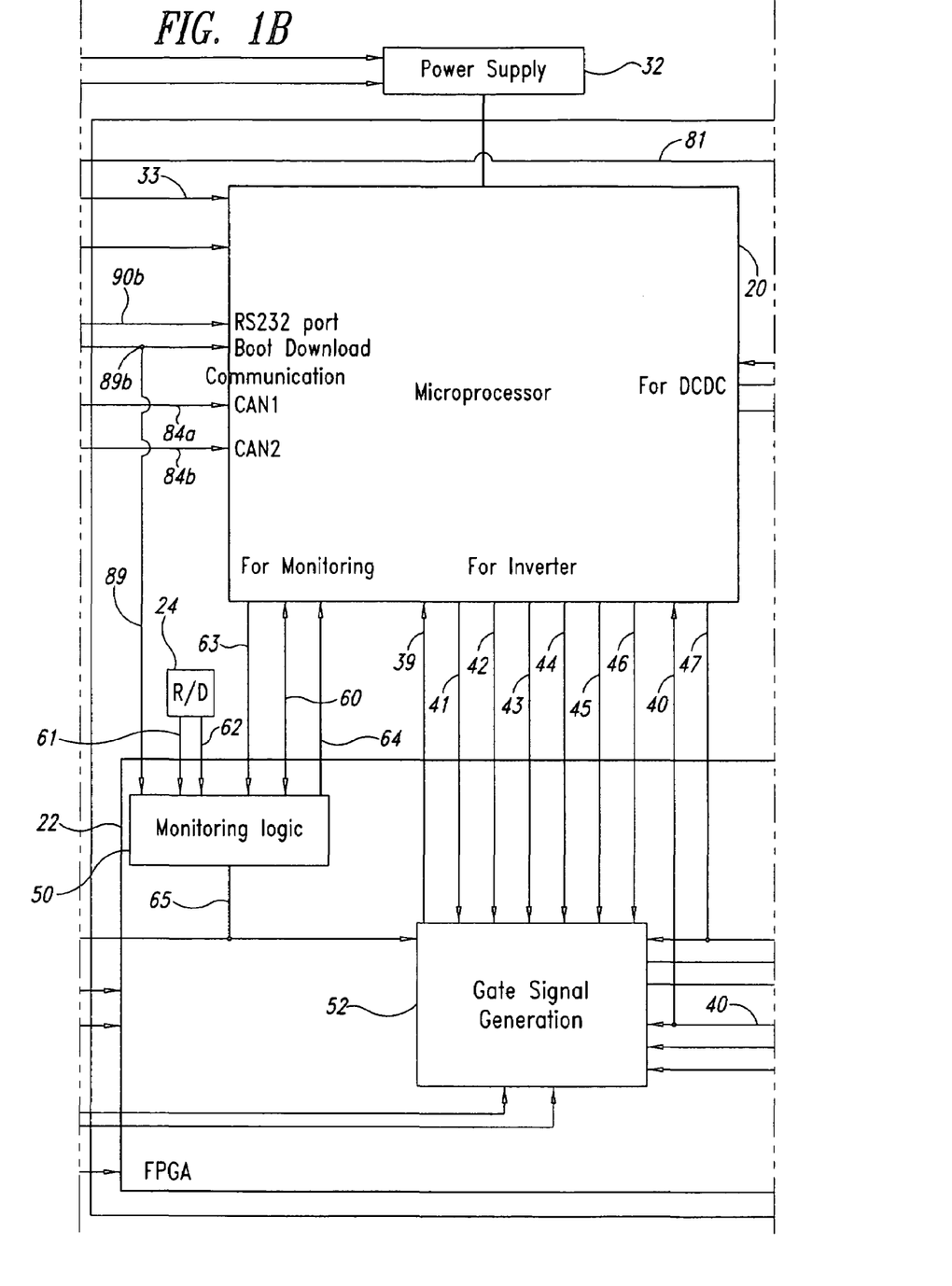
Figure 1C:
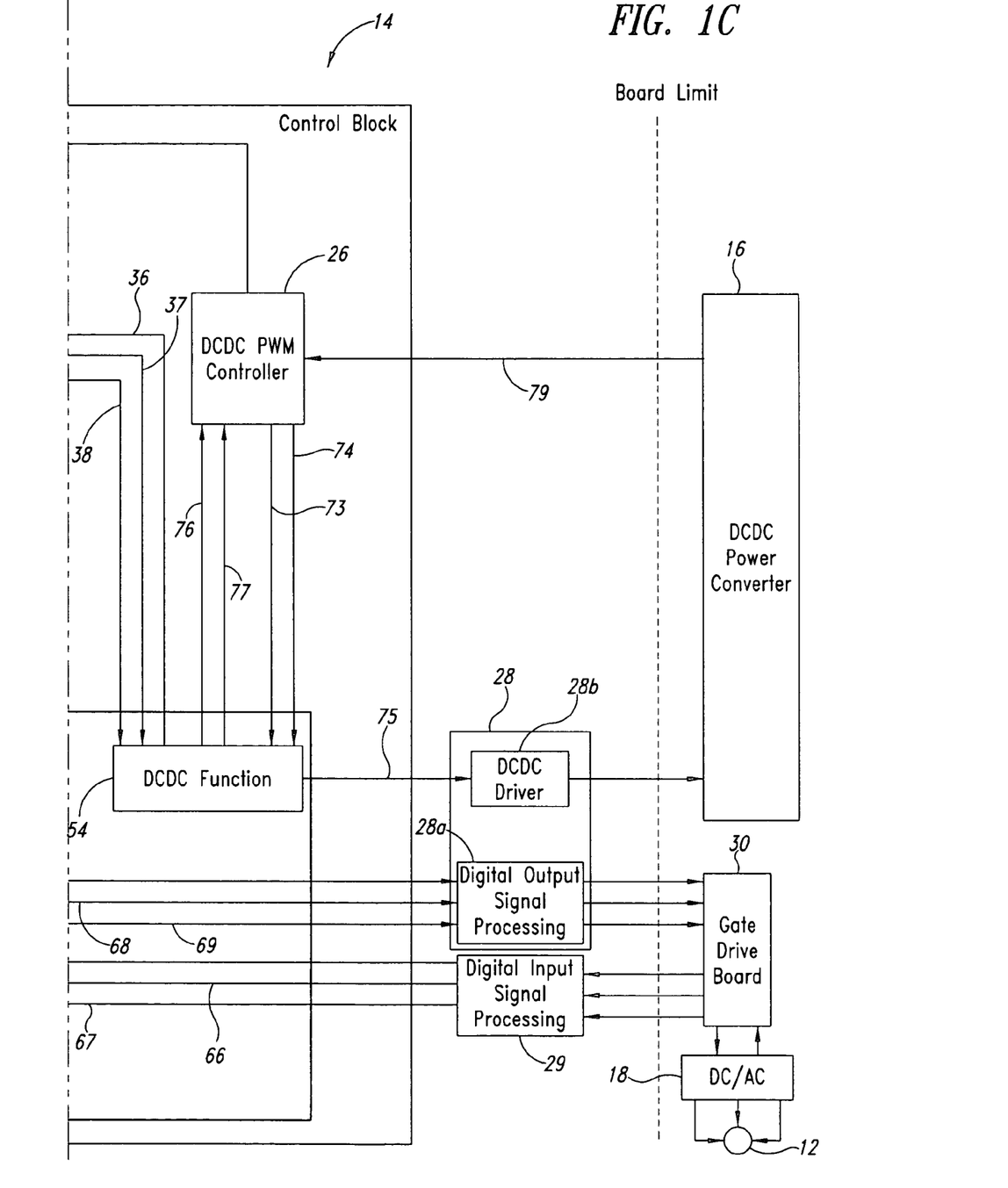

FIGS. 1A-1C show a portion of an electric drive system 10 according to one illustrated embodiment.

The electric drive system 10 may include, or may be coupled to drive, various components of an electric or hybrid electric vehicle, for example, a permanent magnet traction motor 12. The electric drive system 10 may comprise a control subsystem 14 and one or more power converters, for example a DC/DC power converter 16 and/or DC/AC power converter 18, operable to modify, transform and/or otherwise transfer electrical power between one or more power sources (not shown) and one or more loads. The power sources may, for example, take the form of one or more energy producing power sources such as internal combustion engines or arrays of fuel cells or photovoltaic cells, and/or may take the form of one or more energy storage power sources such as arrays of chemical battery cells and/or super- or ultra-capacitors. The loads may, for example, take the form of one or more power supplies, compressors, fans, pumps and/or a traction motor, such as the permanent magnet traction motor 12. While typically identified as a load, in some embodiments the traction motor 12 may at times function as a power source, for example when operating in a regenerative braking mode.

The DC/DC power converter 16 may be operable to step-up and/or step-down a DC voltage. The DC/AC power converter 18 may be operable to invert DC power to AC power, for example, to drive the traction motor 12. In some embodiments, the DC/AC power converter 18 may also be operable to rectify AC power to DC power, for example, to recharge a battery using power generated by the traction motor 12 during regenerative braking. Each of the power converters 16, 18 generally comprises a number of power semiconductor switches and a number of power semiconductor diodes electrically coupled in anti-parallel across respective ones of the power semiconductor switches, arranged to form at least a portion of a bridge circuit. The power semiconductor switches, may, for example, take the form of metal oxide semiconductor field effect transistors (MOSFETs), insulated gate bipolar transistors (IGBTs) and/or other switches suitable for high power operation. In some embodiments, the power semiconductor diodes may be formed as part of the power semiconductor switches, for example as body diodes, while in other embodiments the power semiconductor diodes may take the form of discrete semiconductor devices.

The control subsystem 14 may comprise one or more microprocessors 20 and one or more updatable components, such as one or more field programmable gate arrays (FPGA) 22, or random access memory (RAM) or read only memory (ROM). The FPGA 22 is physically independent from the microprocessor 20, and communicates therewith via an appropriate interface. The control subsystem 14 may also include a resolver-to-digital (R/D) converter 24 and/or DC/DC pulse width modulation (PWM) controller 26. The control subsystem 14 may further include dedicated output signal processor 28 and digital input signal processor 29, both communicatively coupled to the DC/AC power converter 18 via a gate drive board 30. The control subsystem 14 may further include a communications subsystem 31, as well as a power supply 32 and signal processor 34 communicatively coupled to supply wake up signals 27 to the power supply 32, and analog and digital signals 33 to the microprocessor 20.

The microprocessor 20 is operable to execute instructions which may be stored in a memory such as a read only memory (ROM) and/or random access memory (RAM) (not shown), to produce a variety of outputs based on a variety of inputs in order to control operation of the electric drive system 10 in conjunction with the FPGA 22. For example, the microprocessor 20 may receive a clock signal from an off-chip clock 35, or an on-chip clock. Also for example, with respect to operation of the DC/DC power converter 16, the microprocessor 20 may receive DC/DC fault on data bus signals on data bus line 36, and may provide PWM signals on PWM for DC/DC Vref (reference voltage) line 37 and enable DC/DC signals on an enable DC/DC line 38. With respect to operation of the DC/AC power converter 18, the microprocessor 20 may receive gate drive (GD) fault signals indicative of a fault on a gate drive board via a GD fault data bus line 39, and backup power feedback signals on a backup power feedback line 40. The microprocessor 20 may provide emergency power off (EPO) type signals on an EPO type line 41, DC/AC converter reset signals on an Inverter Reset line 42, enable signals for the DC/AC power converter 18 on Inverter Enable line 43, protection type signals on Protection Type line 44, PWM clock signals on PWM Clock line 45, and PWM signals on PWM signals line 46, as well as signals commanding backup power command via a backup power command line 47.

The FPGA 22 is configurable to implement a number of functions to produce a variety of outputs based on a variety of inputs in order to control operation of the electric drive system 10 in conjunction with the microprocessor 20. The functions include monitoring logic 50, gate signal generation 52, and DC/DC function 54. The FPGA 22 is reprogrammed via flash 56, and may receive a clock signal 58 from an on-chip or off-chip clock. The logic is programmed into the FPGA 22, and may be reprogrammed as necessary or desirable. Certain portions of the FPGA 22, for example the monitoring logic 50, may be protected or isolated from reprogramming of other portions of the FPGA 22. The programming for the FPGA 22 may be via a dedicated interface port.

The monitoring logic 50 receives a variety of inputs and produces a variety of outputs in implementing monitoring of the operation of the microprocessor 20. For example, as explained in more detail below, the monitoring logic 50 may exchange questions and answers 60 with the microprocessor 20. The monitoring logic may also receive direction signals via a direction line 61 and speed signals via a North Mark line 62 from the R/D converter 24. The R/D converter 24 operates to provide digitized signals indicative of angular position of the permanent magnet traction motor 12. The monitoring logic 50 may also receive a download or power-up check signals via a download or power-up check line 63 from the microprocessor 20. The monitoring logic 50 is capable of providing a reset signal to a reset pin of the microprocessor 20 via a reset line 64, as well as a disable drive and CAN2 signal to the gate signal generation function 52 and communications subsystem 31 via a Disable Drive and CAN2 line 65. In one embodiment the microprocessor 20 cannot modify or stop the operation of the monitoring logic 50.

The gate signal generation function 52 receives a variety of inputs and produces a variety of outputs in implementing control of the DC/AC power converter 18, including the production of power and the handling of faults. For example, the gate signal generation function 52 receives signals via lines 41-47 from the microprocessor 20. Additionally, the gate signal generation function 52 receives the backup power feedback on line 40 from the gate drive board 30 via the digital input signal processor 29. The gate signal generation function 52 also receives over voltage fault signals via HV OV faults line 66 and desaturation fault signals via desat faults line 67 which are indicative of a problem with one of the power transistors, from the gate drive board 30 via the digital input signal processor 29. The gate signal generation function 52 provides gate signals via gate signal line 68 (e.g., six gate signals) and a DC/AC reset signal via inverter reset line 69 to the gate drive board 30 via a digital output signal processor 28a of the output signal processor 28. Additionally, the gate signal generation function 52 may receive an emergency power off (EPO) signal via an EPO line 70 and exchange an interlock signal on interlock line 71 with a vehicle control system via a vehicle harness 72.

The DC/DC function 54 receives a variety of inputs and produces a variety of outputs in implementing control of the DC/DC power converter 16 in conjunction with the DC/DC PWM controller 26 and a DC/DC driver 28b of the output signal processor 28. For example, the DC/DC function 54 may receive the PWM for DC/DC reference voltage signals via the PWM for DC/DC Vref line 37 and the enable DC/DC signal via the Enable DC/DC line 38 from the microprocessor 20. The DC/DC function 54 may also, for example, receive faults signals via faults line 73 and high voltage PWM signals from the DC/DC PWM controller 26 via HV PWM line 74. The DC/DC function 54 may provide PWM drive signals (e.g., four high voltage PWM and two low voltage PWM signals) to the DC/DC driver 28b of the output signal processor 28 via HV PWM and LV PWM lines 75 for driving the DC/DC power converter 16. The DC/DC function 54 may also provide the DC/DC faults signals via a DC/DC fault on data bus line 36 to the microprocessor 20, and may provide enable signals via an Enable line 76 and voltage reference signals via a Vref line 77 to the DC/DC PWM controller 26.

The DC/DC PWM controller 26 is operable to provide PWM drive signals to the DC/DC driver 28b via the DC/DC function 54 of the FPGA 22. In addition to above discussed signals received and provided by the DC/DC PWM controller 26, the DC/DC PWM controller 26 may receive temperature, voltage and current signals on one or more lines (collectively) 79 and may also provide analog signals on an analog signal line 81 to the signal processor 34 for use in operating the power supply 32.

The communications subsystem 31 provides communications between the microprocessor 20 and other elements of the vehicle as well as with programming, testing and/or diagnostic equipment via a first controller area network (CAN) channel 78a and a second CAN channel 78b. The second CAN channel 78b is for normal vehicle communications while the first CAN channel 78a is reserved for program download and/or diagnostics. The two CAN channels 78a, 78b will not work at the same time over the vehicle CAN bus. Rather, the second CAN channel 78b may be disabled by the monitoring logic 50 of the FPGA 22 in response to a detection or determination of the existence of a fault condition, and the first CAN channel 78a made functional for downloading programs and/or diagnostics.

To implement such, the communications subsystem 31 comprises a first CAN transceiver 80a and second CAN transceiver 80b and switch mechanism 82 operable to selectively switch CAN ports 84a, 84b of the microprocessor 20 between the CAN channels 78a, 78b. The switch mechanism 82 may comprise a first switch 82a, second switch 82b, and third switch 82c. The first switch 82a is selectively operable to provide and to remove a communications path between the first CAN transceiver 80a and the first CAN port 84a. The second switch 82b is selectively operable to provide and to remove a communications path between the second CAN transceiver 80b and the second CAN port 84b. The third switch 82c is selectively operable to provide and to remove a communications path between the second CAN transceiver 80b and the first CAN port 84a. The switch mechanism 82 may be responsive to the disable drive and CAN 2 signal provided by the monitoring logic 50 of the FPGA 22 via the Disable Drive and CAN2 line 65, as described in more detail below with reference to FIGS. 4A-4C.

In the case of a failure of the microprocessor 20, the monitoring logic 50 of the FPGA 22 may enter a protective state. The monitoring logic 50 may also issue a reset signal to the microprocessor 20. After a set number of attempts (e.g., five) by the monitoring logic 50 to reset the microprocessor 20, the monitoring logic 50 may maintain the microprocessor 20 in a persistent shutdown state if the microprocessor 20 still exhibits a fault, for example, by providing incorrect answers to questions or queries by the monitoring logic 50. The microprocessor 20 remains in the persistent shutdown state until a new power cycle occurs. Such monitoring of the operation of the microprocessor 20, as well as monitoring of the operation of the monitoring logic 50 is explained more fully below with reference to FIGS. 2 and 3.

The protective state may include removing a communications path between the second CAN port 84b and the second CAN transceiver 80b, without regard to the outputs of the microprocessor 20, to prevent possibly corrupted data from being transmitted. The protective state may additionally include removing a communications path between the first CAN port 84a and the first CAN transceiver 80a. The protective state may additionally include providing a communications path between the first CAN port 84a and the second CAN transceiver 80b to provide communications for diagnostic and recovery such as by provision of new software or firmware instructions. The protective state may additionally disable one or more of the power converters 16, 18. The protective state may additionally disable the gate drive board 30.

In the protective state, the state of the power semiconductor switches in the DC/AC power converter 18 are dependent on the speed and a fault history. If the speed is below a speed threshold, then all of the power semiconductor switches will be placed in an open (i.e., non-conducting) state. If the speed is above the speed threshold, some of the power semiconductor switches are placed into the closed (i.e. conducting) state and some in the open (i.e. non-conducting) state to electrically short the traction motor 12. For example, where the DC/AC power converter 18 includes three pairs of power semiconductor switches (i.e., upper and lower power semiconductor switches for each of three phases A, B, C), the three upper or the three lower power semiconductor switches will be closed (i.e., conducting) depending on the fault history (for example, if a fault was previously detected in one of the three upper semiconductor switches, then the three lower semiconductor switches will be closed). The speed may be read continuously, and therefore the state may change continuously even if the monitoring is in the persistent shutdown state awaiting a power cycle.

The communications subsystem 31 may further comprise an RS232 port driver 86 to provide serial communications between the microprocessor 20, FPGA 22 and an interface 88 suitable for running diagnostics and reconfiguring the software and/or firmware with new instructions. In particular, the RS232 port may transfer a boot strap download of new instructions or programming from the interface 88 to the microprocessor 20 and/or FPGA 22 via a bootstrap download line 89a, 89b. The RS232 port may provide a communications path 90a, 90b between the microprocessor 20 and an interface 88 useful in performing software development. The RS232 port may further provide wake up signals 91 to the power supply 32.

The electric drive system 10 employs three levels of monitoring. A first or functional level includes monitoring motor management functions, for example converting requested motor torque, component monitoring, input/output variable diagnosis, and controlling reactions of the electric drive system 10 when an error or fault is detected. A second or function monitoring level includes detecting a defective sequence of the level 1 functional software, for example by monitoring the calculated torque values, and triggering specific reactions of the electric drive system 10 if a fault or error is detected. A third or controller monitoring level includes a monitoring module (i.e., monitoring logic 50 of FPGA 22) that is independent of the main controller (i.e., microprocessor 20), which tests that the main controller is operating correctly. As explained in detail below, this may include a question and answer process. The monitoring module may trigger or cause specific reactions by the electric drive system 10 independent of the main controller when an error or fault is detected.

As an overview, the monitoring logic 50 provides questions or queries to the main controller from time-to-time (e.g., one every 40 ms). The questions may be randomly selected from a set of defined questions. To reduce communications overhead, the questions may be stored in, or at the microprocessor 20, with the monitoring logic simply providing a pointer to the appropriate question or questions. The monitoring logic 50 expects to receive an answer within a defined period. For example, where the main controller processes the monitoring function queries every 10 ms, an answer is expected within approximately 15 ms after the question is provided. A received response may take the form of a correct answer, an incorrect answer, or an answer at a wrong time. An answer received within a defined interval (e.g., between 15 ms and 40 ms) is classified as an answer at the wrong time, and the monitoring logic 50 may treat such in a similar fashion as wrong answers.

When a correct answer is received, the monitoring logic 50 decrements a wrong answer counter if such counter is greater than zero, and provides the next question at the next interval. When a received answer is either wrong or an answer at a wrong time, or where no answer is received in a defined period of time (e.g., 15 ms), the monitoring logic 50 increments the wrong answer counter. The monitoring logic 50 then provides the same question again to the microprocessor 20, which may occur also immediately rather than waiting for a next defined interval, if defined intervals are employed.

If additional incorrect answers or answers at a wrong time are received, the wrong answer counter is incremented until the wrong answer counter equals or exceeds a defined value (e.g., 3) at which point the monitoring logic 50 enters a protective state (described above), as well as provides a reset signal to the microprocessor 20 via reset line 64 (FIG. 1B).

If the microprocessor 20 persists in sending incorrect answers after a threshold number of reset attempts (e.g., 3), the monitoring logic stops trying to reset the microprocessor 20, and remains in a persistent shutdown state until a power cycle occurs. The protective state is active while in the persistent shutdown state.

Figure 2:
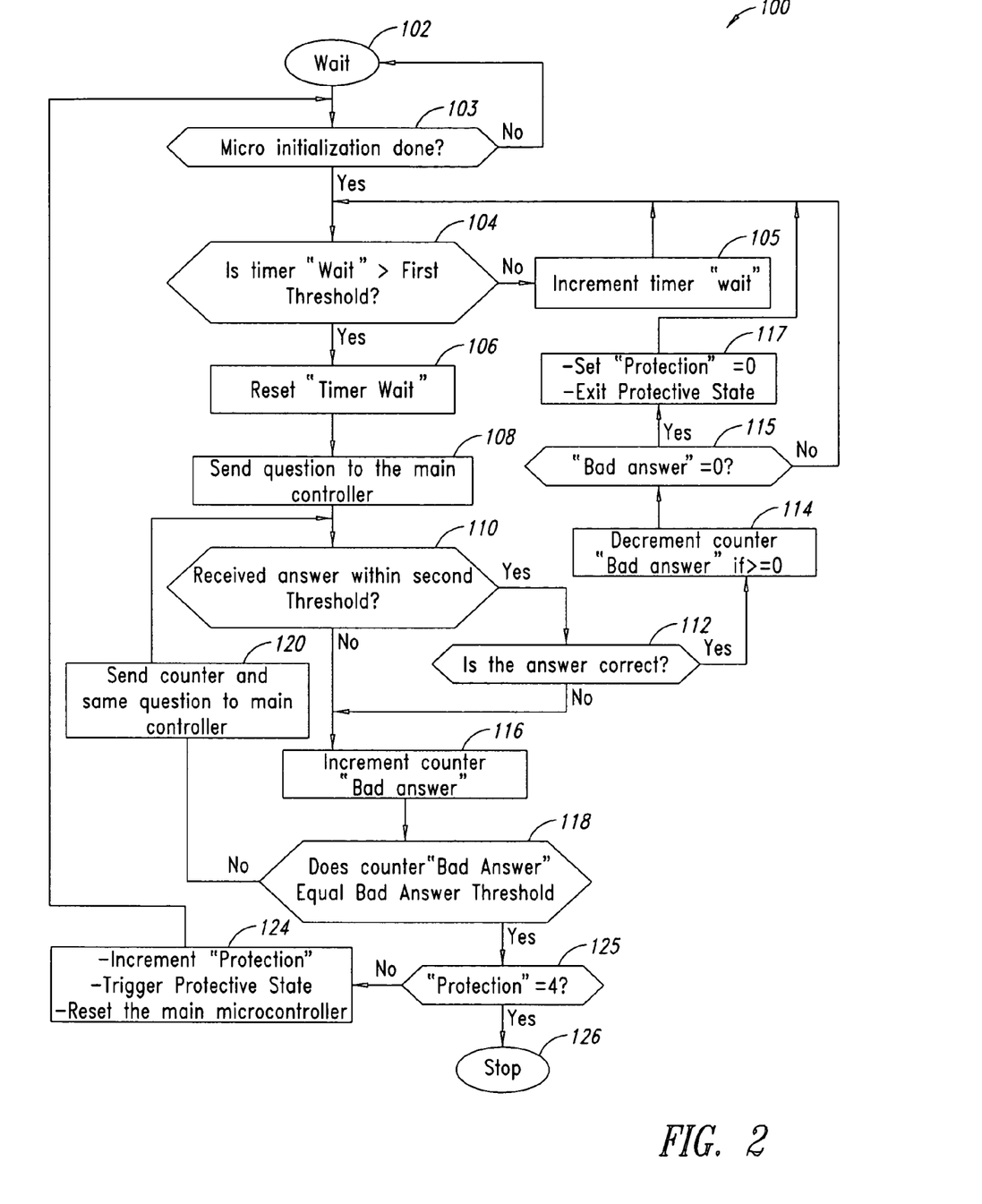
FIG. 2 is a flow diagram showing a method of operating a monitoring module such as the monitoring logic of the field programmable gate array to monitor the operation of a main controller such as the microprocessor, according to one illustrated embodiment.

FIG. 2 shows a method 100 of monitoring operation of the microprocessor 20 using the monitoring logic 50 of the FPGA 22, according to one illustrated embodiment. The method 100 involves providing questions or queries from time-to-time to the microprocessor 20 from the monitoring logic 50 of the FPGA 22, and evaluating the answers received from the microprocessor 20.

The monitoring logic executes a wait loop, waiting at 102, determining at 103 whether the microprocessor initialization has been performed, and determining at 104 whether a wait timer is greater than a threshold (e.g., 10 ms). If the wait timer has not exceeded the threshold, the wait timer is incremented at 105 and control returns to 104 to repeat the wait loop. Otherwise control passes to 106.

At 106, the monitor logic resets the wait timer. At 108, the monitoring logic 50 provides a question to the microprocessor 20. For example, the monitoring logic 50 may provide a speed and torque, for example from a lookup table, to the microprocessor 20. As noted above, to reduce communications overhead the questions or queries may be stored at the microprocessor 20 and the monitoring logic provides a pointer to a randomly selected one of the stored questions or queries. At 110, the monitoring logic 50 determines whether an answer to the question is received from the microprocessor 20 within a threshold time (e.g., 15 ms). At 112, the monitoring logic 50 determines whether the received answer is correct. For example, the microprocessor 20 may return a power value calculated based on the provided speed and torque values, and the monitoring logic 50 may compare the returned power value to a correct power value for the previously provided speed and torque values.

If the monitoring logic 50 determines at 112 that the received answer is correct, the monitoring logic 50 decrements a bad answer counter at 114 if the bad answer counter is at least equal to zero. The monitoring logic 50 then determines whether the bad answer counter is equal to zero at 115. The monitoring logic 50 returns control directly to 104 if the bad answer counter is not equal to zero. Alternatively, if the bad answer counter is equal to zero, the monitoring logic 50 sets a protection flag to zero and exits the protective state at 117, if the protective state was active, before returning control to 104. If the received answer is incorrect, the monitoring logic 50 increments the bad answer counter at 116 and passes control to 118.

At 118, the monitoring logic 50 determines if the bad answer counter exceeds a bad answer threshold (e.g., 3). If the bad answer counter does not exceed the threshold, the monitoring logic 50 sends the value of the counter and the same question to the microprocessor 20 at 120, and returns control to 110. If the bad answer counter does exceed the bad answer threshold, the monitoring logic 50 checks whether the protection counter value exceeds a threshold value (e.g., 4) at 125. If the protection counter does exceed the threshold, control is passed to 126 where the persistent shutdown state is triggered. If the protection counter does not exceed the threshold, then control is passed to 124. At 124, the monitoring logic 50 increments the protection counter, triggers the protective state, and sends a reset signal to the microprocessor 20 before returning control to 103. As an overview, the microprocessor 20 not only answers questions or queries posed by the monitoring logic 50, but may also verify the operation of the monitoring logic 50. When a computed answer is sent back to the monitoring logic 50, a wrong answer counter is decremented if the wrong answer counter is greater than one (1) or maintained if the wrong answer counter is equal to zero (0). From time-to-time (e.g., after every 5 computed answers), the microprocessor 20 intentionally provides an incorrect answer to the monitoring logic 50.

The microprocessor 20 also monitors the timing of the questions or queries posed by the monitoring logic 50. If no question is received for more than a defined period (e.g. 50 ms) after receipt of a previous question or query, the microprocessor 20 treats such lack of question or query the same as receiving a wrong answer counter.

Upon receipt of a wrong answer counter from the monitoring logic 50, the microprocessor 20 does not wait for a next question or query, but rather sends an intentionally incorrect answer to the monitoring logic 50 and waits for a response. The response time (e.g., 20 ms) from the monitoring logic 50 in such a situation should be less than the typical response time (e.g., 50 ms). The microprocessor 20 keeps track of a monitoring error counter, which is incremented when the wrong answer counter is incorrect and decremented if the wrong answer counter is correct and greater than 1.

If the monitor error counter exceeds a threshold value (e.g., 3), such is taken as indicative that the monitoring logic 50 is not operating properly, and the microprocessor 20 disables the drive, entering a protective state and setting a flag to indicate the suspect error or fault is in the monitoring logic 50. The microprocessor 20 continues communicating with the monitoring logic 50 in the protective state, in a fashion similar to the communications in a normal state. The microprocessor 20 remains in the protective state even if the monitoring logic 50 starts working properly after shutdown, until the occurrence of a power cycle.

Figure 3:
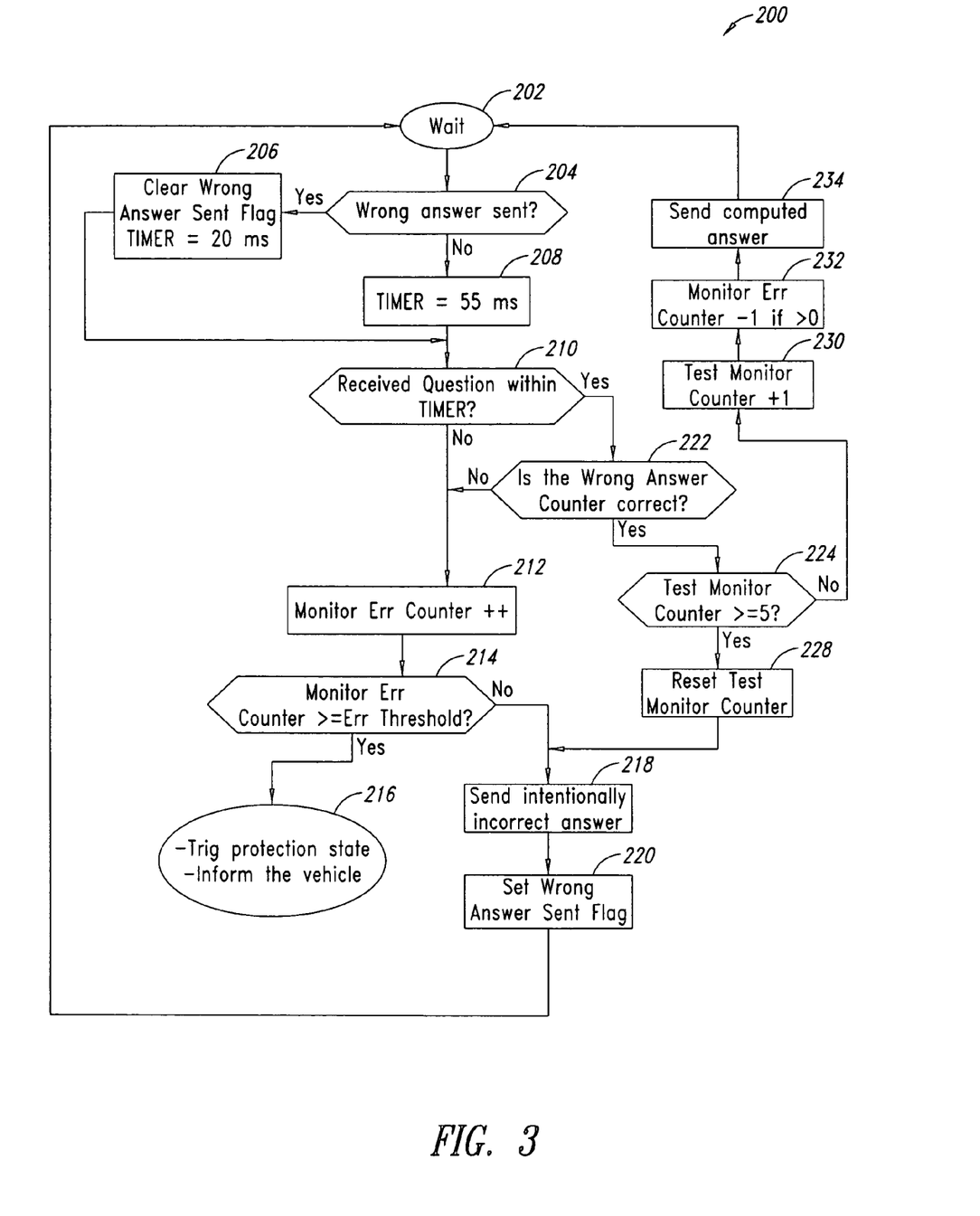
FIG. 3 is a flow diagram showing a method of operating the main controller to monitor the operation of a monitoring module such as the field programmable gate array, according to one illustrated embodiment.

FIG. 3 shows a method 200 of monitoring the operation of the monitoring logic 50 of the FPGA 22 using the microprocessor 20, according to one illustrated embodiment. The method 200 involves the microprocessor 20 from time-to-time intentionally providing an incorrect answer to a question or query from the monitoring logic 50.

The microprocessor 20 executes waits at 202, and at 204 determines whether the microprocessor 20 has intentionally sent an incorrect answer in response to a question or query from the monitoring logic 50 of the FPGA 22. For example, the microprocessor 20 may check the value of a wrong answer flag. The microprocessor 20 sets a time out value equal to a first value (e.g. 20 ms) and clears the wrong answer sent flag at 206 if an incorrect answer has been intentionally sent, or sets the time out value equal to a second longer value (e.g., 55 ms) at 208 if an incorrect answer has not been intentionally sent.

At 210, microprocessor 20 determines whether a next question is received within the time out value previously set at either 206 or 208. If a next question is not received within the time out value previously set at either 206 or 208, the microprocessor 20 increments a monitor error counter at 212, and determines whether the monitor error counter exceeds a threshold (e.g., three) at 214. If the monitor error counter exceeds the threshold, the microprocessor 20 at 216 triggers a protective state and informs the vehicle. Otherwise, the microprocessor 20 sends an intentionally incorrect answer to the monitoring logic 50 at 218, sets a wrong answer sent flag at 220 and returns control to 202. In sending an intentionally incorrect answer, the microprocessor 20 may, for example, provide a power value that is incorrect for the speed and torque values identified by the question or query.

If the microprocessor 20 determines at 210 that a next question is received within the time out value previously set at either 206 or 208, the microprocessor 20 determines whether the wrong answer counter is correct at 222. If the wrong answer counter is not correct, control passes to 212 where the monitor error counter is incremented. If on the other hand the wrong answer counter is correct, the microprocessor 20 determines whether the test monitor counter equals or exceeds a threshold value (e.g., 5) at 224.

If the test monitor counter equals or exceeds the threshold value, the microprocessor 20 resets the test monitor counter at 228, and control passes to 218. If the test monitor counter does not equal or exceeds the threshold value, the microprocessor 20 increments the test monitor counter at 230. The microprocessor 20 then decrements the monitor error counter at 232 if the monitor error counter is greater than zero, sends a computed answer at 234 and returns to 202 where the microprocessor 20 waits. As noted above, the computed answer may take the form of a power value calculated based on speed and torque values provided as the question. The computed answer sent at 234 should be a correct answer to the question or query if the microprocessor 20 is operating correctly, and not sending an intentionally incorrect answer.

Figure 4A:
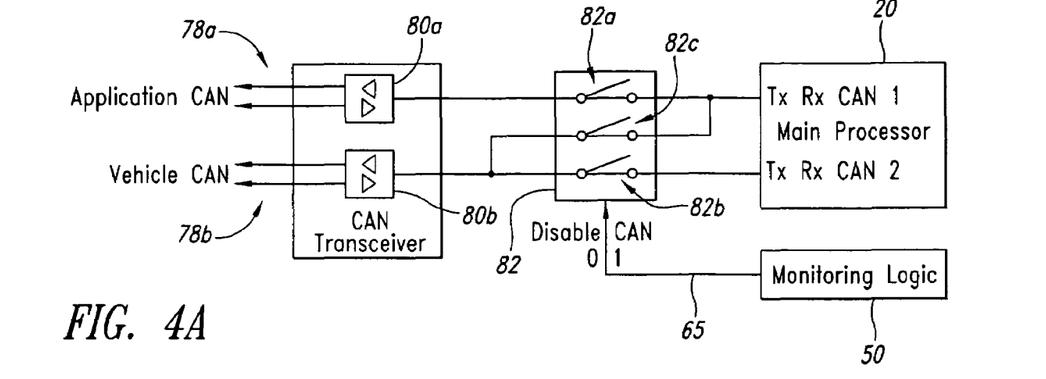
FIG. 4A is a schematic diagram showing a switch mechanism operable to switch CAN ports of a main controller between two CAN channels via a pair of CAN transceivers, according to one illustrated embodiment.

FIG. 4A is a schematic diagram showing the switch mechanism 82 operable to switch CAN ports CAN1, CAN2 of a main controller such as the microprocessor 20, between two CAN channels 78a, 78b, according to one illustrated embodiment. The switch mechanism is responsive to a disable signal supplied from the monitoring logic 50 via the Disable Drive and CAN2 line 65.

Figure 4B:
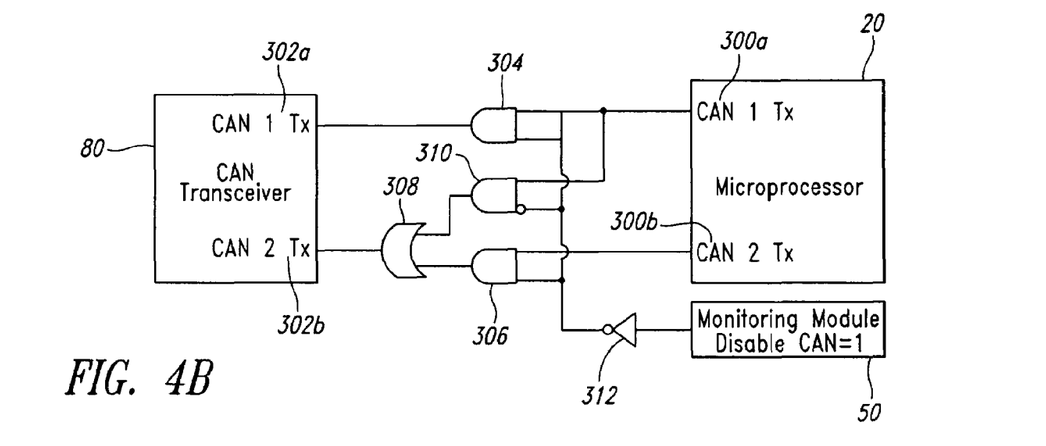
FIG. 4B is a logic diagram for implementing the switch mechanism of FIG. 4A with respect to transmit lines or ports of the CAN transceivers, according to one illustrated embodiment.

FIG. 4B is a logic diagram for implementing the switch mechanism 82 of FIG. 4A with respect to transmit lines or ports of the CAN transceivers, collectively referenced as 80, according to one illustrated embodiment.

The microprocessor 20 has first and second transmission ports 300a, 300b, while the CAN transceiver 80 has first and second transmission ports 302a, 302b. The first transmission port 300a of the microprocessor 20 is coupled to the first transmission port 302a of the CAN transceiver 80 by a first AND gate 304. The second transmission port 300b of the microprocessor 20 is coupled to the second transmission port 302b of the CAN transceiver 80 by a second AND gate 306 and an OR gate 308. A third AND gate 310 couples the first transmission port 300a of the microprocessor 20 to the second transmission port 302b of the CAN transceiver 80 via the OR gate 308. A NOT gate 312 receives the disable signal, which may take the form of a binary signal (e.g., 0/1, Low/High, Open/Closed), and supplies the NOT of the binary signal to the first, second and third AND gates 304, 306, 310.

Figure 4C:
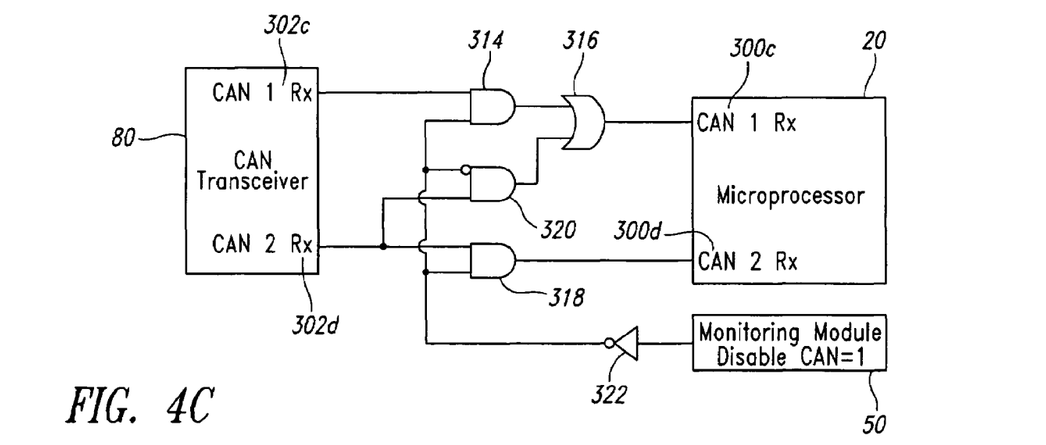
FIG. 4C is a logic diagram for implementing the switch mechanism of FIG. 4A with respect to receive lines or ports of the CAN transceivers, according to one illustrated embodiment.

FIG. 4C is a logic diagram for implementing the switch mechanism 82 of FIG. 4A with respect to receive lines or ports of the CAN transceivers, collectively referenced as 80, according to one illustrated embodiment.

The microprocessor 20 has first and second receive ports 300c, 300d, while the CAN transceiver 80 has first and second receive ports 302c, 302d. The first receive port 302c of the CAN transceiver 80 is coupled to the first receive port 300c of the microprocessor 20 by a first AND gate 314 and an OR gate 316. The second receive port 302d of the CAN transceiver 80 is coupled to the second receive port 300d of the microprocessor 20 by a second AND gate 318. A third AND gate 320 couples the second receive port 302d of the CAN transceiver 80 to the first receive port 300c of the microprocessor 20 via the OR gate 316. A NOT gate 322 receives the disable signal and supplies the NOT of the binary disable signal to the first, second and third AND gates 314, 318, 320.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In some embodiments, control may be coordinated among the control subsystem 14 and a fuel cell system controller (not shown) and/or an integrated power train controller (not shown), for example via the CAN.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although specific embodiments of and examples for the electric drive system and methods are described herein for illustrative purposes, various equivalent modifications can be made without departing from the spirit and scope of the disclosure, as will be recognized by those skilled in the relevant art. The teachings provided herein can be applied to other power system, not necessarily the electric drive system employing the DC/DC power converter 16 and a DC/AC power converter 18 generally described above.

Portions of the electric drive system 10 may be integrated into a housing to form a power module (not shown). For example, the control subsystem and power converters 16, 18 may be integrated into a housing. In particular, the power module may include an electrically insulative lead frame, an integrated base plate heat sink and an electrically insulative cover, collectively forming the housing.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. patent application Ser. No. 10/738,926 filed Dec. 16, 2003, and entitled "Power Module With Heat Exchange"; U.S. patent application Ser. No. 10/688,834, filed Oct. 16, 2003, and entitled "Power Converter Employing A Planar Transformer"; U.S. patent application Ser. No. 60/560,755, filed Jun. 4, 2004, and U.S. patent application Ser. No. 10/964,000, filed Oct. 12, 2004, both entitled "Integration of Planar Transformer and Power Switches in Power Converter"; and U.S. provisional patent application Ser. No. 60/695,829, filed Jun. 30, 2005, and entitled "Controller Method, Apparatus and Article Suitable for Electric Drive"; are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all power converters. Accordingly, the invention is not limited by the disclosure, but instead its scope is to be determined entirely by the following claims.

The invention claimed is:

1. A control system to control an electric drive, the control system comprising:
a main controller operable to execute instructions including the computation of a value based on at least one parameter; and
a monitoring module operable to provide queries from time-to-time to the main controller, operable to evaluate an accuracy of an answer to a query returned to the monitoring module by the main controller, and operable to execute a protective state entry procedure in response to a determination that a number of answers returned by the main controller that are determined to be incorrect exceeds a threshold value, wherein executing the protective state entry procedure comprises disabling a first communications path between the main controller and a vehicle.

2. The control system of claim 1 wherein executing the protective state entry procedure further comprises disabling a gate drive providing drive control signals to a power converter supplying power to a traction motor.

3. The control system of claim 2 wherein executing the protective state entry procedure further comprises disabling the gate drive providing drive control signals to the power converter such that the traction motor is electrically shorted.

4. The control system of claim 2 wherein executing the protective state entry procedure further comprises disabling the gate drive providing drive control signals to the power converter such that all the semiconductor switches are placed in a non-conducting state.

5. The control system of claim 1 wherein the main controller comprises a microprocessor and the monitoring module comprises monitoring logic configured in a reconfigurable electronic circuit device.

6. The control system of claim 1 wherein the monitoring module is further operable to determine whether a response to the answer to the query is timely received from the main controller.

7. The control system of claim 1 wherein the monitoring module provides queries comprising a speed value and a torque value, and receives answers in the form of a power value computed based on the speed and torque values.

8. A control system to control an electric drive, comprising:
a main controller operable to execute instructions including the computation of a value based on at least one parameter; and
a monitoring module operable to provide queries from time-to-time to the main controller, to evaluate an accuracy of an answer to the query returned to the monitoring module by the main controller, and to enter a protective state in response to a determination that a number of answers returned by the main controller that are determined to be incorrect exceeds a threshold value, wherein the main controller is further operable to, from time-to-time provide an intentionally incorrect answer to a query from the monitoring module and to evaluate an operation of the monitoring module based on a handling of the intentionally incorrect answer by the monitoring module.

9. The control system of claim 8 wherein the main controller evaluates the operation of the monitoring module by evaluating a wrong answer counter returned to the main controller by the monitoring logic.

10. The control system of claim 8 wherein the main controller is further operable to shutdown operation of the monitoring module in response to an evaluation that the monitoring logic is not operating correctly.

11. A control system to control an electric drive, comprising:
a main controller operable to execute instructions including the computation of a value based on at least one parameter;
a communications subsystem selectively operable to provide a first communications path between the main controller and a vehicle network in a first state, and a second communications path between the main controller and an interface suitable for downloading new instructions to the main controller in a second state; and
a monitoring module operable to provide queries from time-to-time to the main controller, to evaluate an accuracy of an answer to the query returned to the monitoring module by the main controller, and to cause the communications system to enter the second state from the first state in response to a determination of an existence of a fault condition in an operation of the main controller.

12. The control system of claim 11 wherein the interface is suitable for performing diagnostic queries of the main controller via the second communications path.

13. The control system of claim 11 wherein the monitoring module is further operable to enter a protective state in response to a determination that a number of answers returned by the main controller that are determined to be incorrect exceeds a threshold value, wherein the main controller is further operable to, from time-to-time provide an intentionally incorrect answer to a query from the monitoring module and to evaluate an operation of the monitoring module based on a handling of the intentionally incorrect answer by the monitoring module.

14. A control system to control an electric drive, comprising:
a main controller operable to execute instructions including the computation of a value based on at least one parameter;
a fault logic module operable to determine an appropriate procedure for discontinuing a supply of electrical power to a traction motor by a power converter based on a speed of the traction motor and/or a fault history;
a communications subsystem selectively operable to provide a first communications path between the main controller and a vehicle network in a first state, and a second communications path between the main controller and an interface suitable for downloading new instructions to the main controller in a second state; and
a monitoring module operable to provide queries from time-to-time to the main controller, to evaluate an accuracy of an answer to the query returned to the monitoring module by the main controller, and to cause the communications system to enter the second state from the first state in response to a determination of an existence of a fault condition in an operation of the main controller.

15. The control system of claim 14 wherein the power converter is a DC/AC power converter comprising a plurality of power semiconductor switches in a bridge configuration and the fault logic module places all of the power semiconductor switches in a non-conducting state if the speed of the traction motor is below a threshold speed.

16. The control system of claim 14 wherein the power converter is a DC/AC power converter comprising a plurality of power semiconductor switches in a bridge configuration and the fault logic module places some of the power semiconductor switches in a non-conducting state, and some of the power semiconductor switches in a conducting state to electrically short the traction motor if the speed of the traction motor is above a threshold speed.

* * * * *